Figure 1:
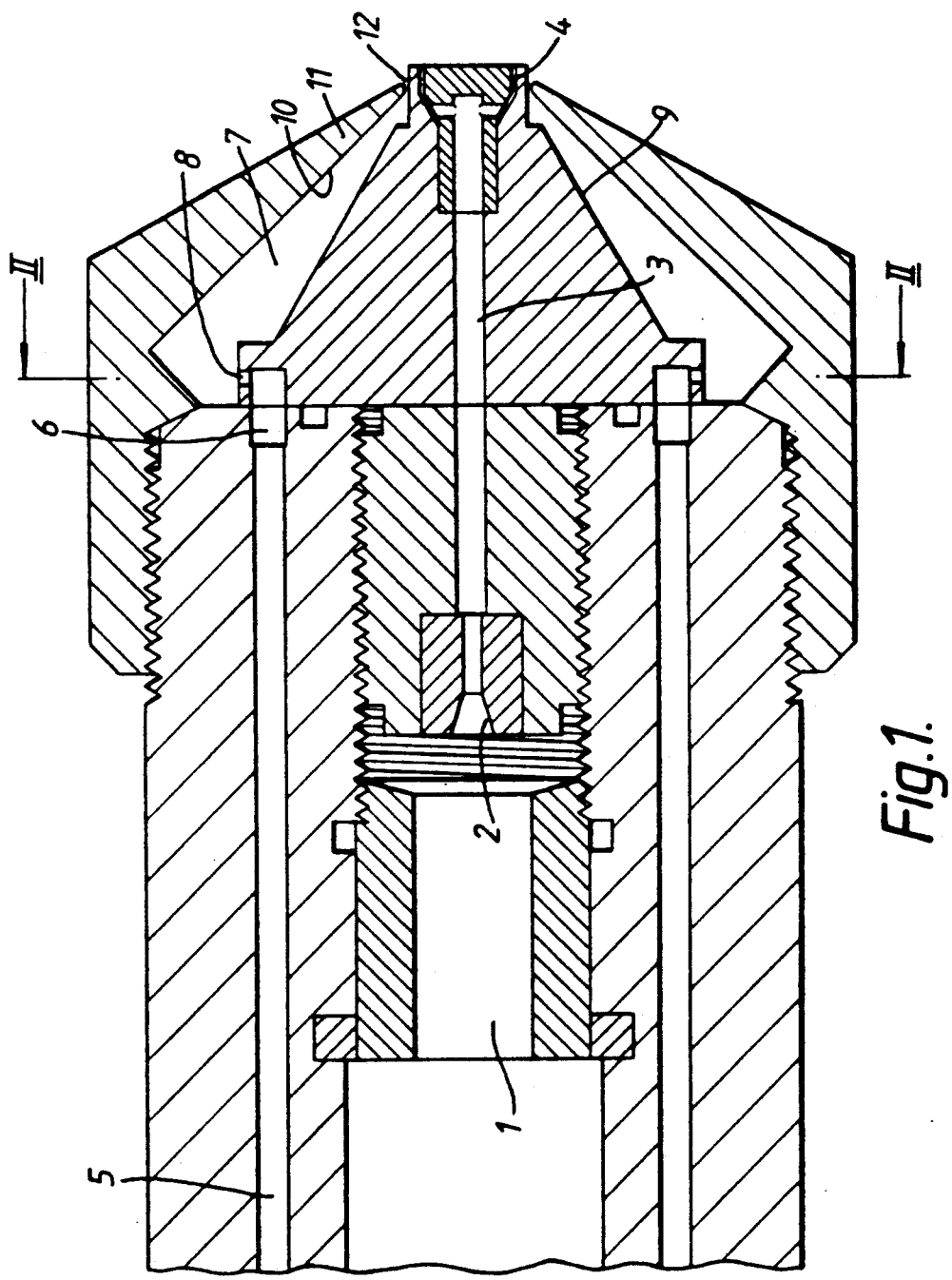

United States Patent [19]

Wollard

[11] Patent Number: 5,181,661
[45] Date of Patent: Jan. 26, 1993

[54] ELECTROSTATIC SPRAY APPARATUS

[75] Inventor: Douglas J. Wollard, Huntingdon, United Kingdom

[73] Assignee: AB Ingredients Ltd., Huntington, United Kingdom

[21] Appl. No.: 707,896

[22] Filed: May 30, 1991

[30] Foreign Application Priority Data

Jun. 1, 1990 [GB] United Kingdom ............... 9012307

[51] Int. Cl.$^5$ .......................... B05B 5/02; B05B 7/10
[52] U.S. Cl. ..................................... 239/704; 239/406
[58] Field of Search ............... 239/405, 406, 704–705, 239/708

[56] References Cited

U.S. PATENT DOCUMENTS

| 579,371 | 3/1897 | Watson | 239/475 |
| 1,052,211 | 2/1913 | Boehm | 239/475 |
| 3,296,015 | 1/1967 | Juvinall et al. | 239/705 X |
| 3,376,097 | 4/1968 | Biber et al. | 239/406 X |

FOREIGN PATENT DOCUMENTS

| 1490206 | 7/1967 | France | 239/704 |
| 111833 | 6/1983 | Norway | 239/708 |

*Primary Examiner*—Andres Kashnikow
*Assistant Examiner*—Kevin Weldon
*Attorney, Agent, or Firm*—Watson, Cole, Grindle & Watson

[57] ABSTRACT

An electrostatic spray apparatus comprises a source of electrostatically charged liquid connected to an annular nozzle which discharges a hollow tube of electrostatically charged liquid, a source of atomizing air under pressure, an annular atomizing air discharge nozzle surrounding the liquid discharge nozzle, and an annular swirl chamber for the atomizing air. A plurality of apertures connect the source of air to the swirl chamber, the apertures being oriented at an angle to the radial direction to initiate a substantially tangential swirling flow of air in the chamber and being disposed to allow air to pass radially outwardly into the chamber. The chamber is defined by walls which tend to converge in an axial direction from the plurality of apertures towards the air discharge nozzle.

8 Claims, 2 Drawing Sheets

ELECTROSTATIC SPRAY APPARATUS

The present invention relates to an electrostatic spray apparatus, and also to a method of coating the interior of containers with an electrostatically charged liquid. The invention is particularly, but not exclusively, directed to the spraying of electrostatically charged oil into containers for baking bread and other confectionery.

The invention will be described with reference to its use in coating baking tins with oil to release subsequently baked items of confectionery or loaves. However, other uses can be foreseen and it is not intended that they are excluded from protection by virtue of reference only to coating baking tins with oil described particularly in this application.

It is well known that bread baking tins should be coated with a release agent such as oil prior to the insertion of dough therein. It is particularly important to coat the sides of the tin to enable removal of the baked loaf. Hitherto, this has been accomplished by simple spraying of a jet of atomized oil. However, this suffers from the disadvantage that a fog of oil particles is created, and this fog is injurious to the health of operatives, and where it settles, may cause slippages and accumulation of dirt. As production line speeds have increased, the pressure needed to spray the oil within the shorter time period allowed has increased, and increased pressure leads to increased fogging. One solution to this problem is to charge the oil electrostatically so that, when it contacts the metal of the baking tin, there is no rebound. This lessens the concentration of oil particles in the atmosphere surrounding the baking tin. However, this is not a complete solution, since the optimum distribution of oil is on the side of the baking tin rather than an overall coating within the container. For this purpose, it is desirable that the jet of atomized charged oil particles is emitted from the apparatus in the form of as flat a cone as may be practicable.

It is an object of the present invention to provide an apparatus which overcomes or obviates to a large degree the above disadvantages and also to provide a method of use of such an apparatus.

FR-A-2319425 discloses an electrostatic spray apparatus for spraying paints comprising a source of liquid, an annular nozzle connected thereto for discharging a hollow tube of electrostatically charged liquid, a source of atomizing air under pressure, an annular atomizing air discharge nozzle surrounding the liquid discharge nozzle, an annular swirl chamber for the atomizing air, and a plurality of apertures connecting the source of air to the swirl chamber, the apertures being oriented at an angle to the radial direction to initiate a substantially tangential swirling flow of air in the chamber.

However, in FR-A-2319425, the apertures are disposed to allow air to pass in a radially inward direction into the chamber, and thus, for any chosen overall diameter of spray apparatus, the inlet diameter of the swirl chamber is limited by the need to accommodate the air supply passages and the apertures outside the swirl chamber. Limiting the inlet diameter of the swirl chamber limits the ratio of inlet diameter to outlet diameter of the swirl chamber and this in turn limits the angle at which the atomizing air leaves the nozzle, and thus limits the conic angle of the liquid spray.

According to a first aspect of the present invention there is provided an electrostatic spray connected thereto for discharging a hollow tube of electrostatically charged liquid, a source of atomizing air under pressure, an annular atomizing air discharge nozzle surrounding the liquid discharge nozzle, an annular swirl chamber for the atomizing air, and a plurality of apertures connecting the source of air to the swirl chamber, the apertures being oriented at an angle to the radial direction to initiate a substantially tangential swirling flow of air in the chamber, wherein the apertures are disposed to allow air to pass in a generally radially outwardly into the chamber, the swirl chamber being defined by walls which tend to converge in an axial direction from the plurality of aperture towards the air discharge nozzle, and wherein said source of liquid is electrostatically charged.

Preferably the liquid is oil or an oil containing composition, advantageously a release oil composition, optionally for use with baking tins for bread or other confectionery.

The swirl chamber preferably decreases in median radial diameter from the plurality of apertures towards the air discharge nozzle.

The source of atomizing air may be at a pressure in the region of 68.95 KN/m$^2$ (10 psi).

The source of liquid may be at a pressure in the region of 27.85 KN/m$^2$ to 82.74 KN/m$^2$ (4 to 12 psi).

The liquid may be electrostatically charged by means of a charge of 50,000 Volts, optionally at a current of 100 microamps.

According to a second aspect of the present invention there is provided a method of coating the interior of open containers with oil or similar liquid comprising the steps of passing the containers adjacent at least one electrostatic spray apparatus of the first aspect of the invention, the apparatus being located within a distance in the region of 10 to 20 mm from the open face of the container, sensing the presence of a container and in response thereto, enabling flow of electrostatically charged oil and atomizing air to create a hollow substantially conical zone of charged atomized oil particles directed towards the interior of the container.

Preferably the open containers are baking tins for bread or confectionery products, and the oil is a release oil composition to enable the product deposited therein subsequently to the coating to be removed from the tins when baked.

The step of enabling flow of electrostatically charged oil and atomizing air may be carried out for a time in the region of 50 to 300 msecs for each container.

In this case, the means to sense the presence of a container may enable a supply of air or other fluid at a comparatively high pressure to act on piston means, said piston means opening, immediately sequentially, valves to supply atomizing air and electrostatically charged oil.

In the case of cuboidal baking tins, it is preferred to have two spray apparatus, one disposed adjacent each end of the container.

Figure 2:
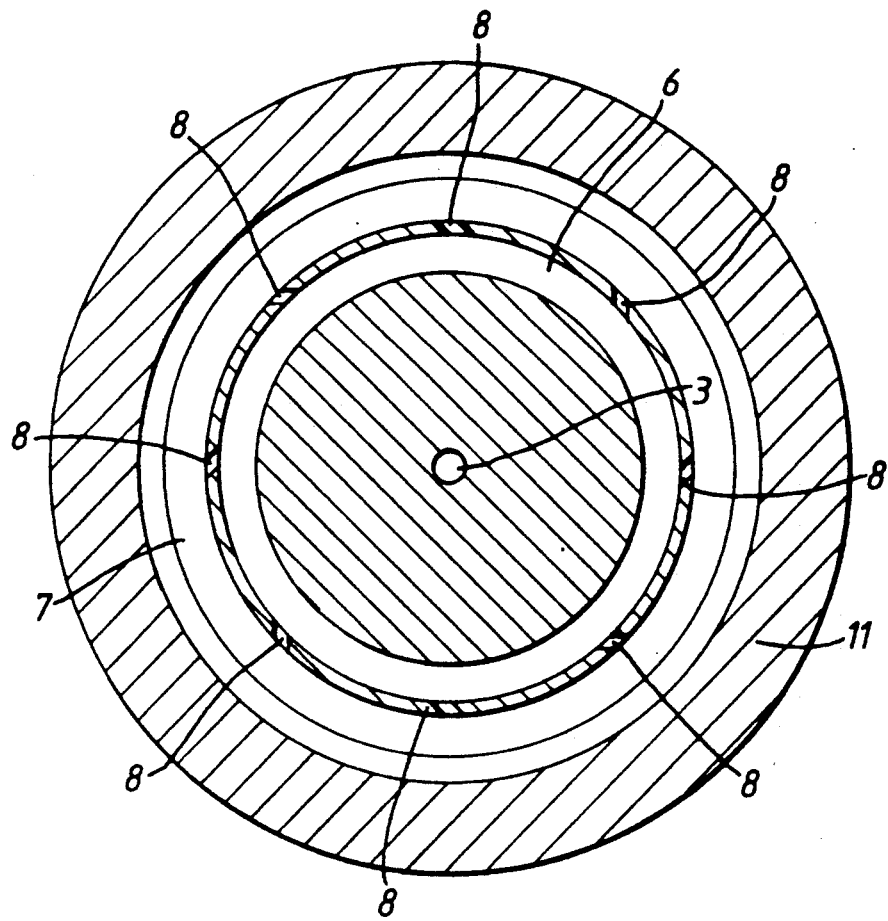

An embodiment of the present invention will now be more particularly described by way of example and with reference to the accompanying drawings, in which:

FIG. 1 is a schematic longitudinal cross-sectional view of an end of a spray apparatus embodying the invention; and FIG. 2 is a cross-sectional view taken on line II—II of FIG. 1.

Referring now to FIG. 1, there is shown a spray head having an oil reservoir 1, to which an oil composition is supplied at a pressure in the region of 27.58 KN/m$^2$ to 82.74 KN/m$^2$ (4 to 12 psi) and which is charged to minus 50,000 Volts and at a maximum current of 100 microamps. The oil reservoir 1 is closed by means of a needle (not shown) fitting in a needle seat 2. When the needle is withdrawn, oil may flow through passage 3 to an annular nozzle 4. This nozzle has a gap in the region of 0.35 mm or less. Oil exiting from this nozzle forms a hollow tube.

A supply of atomizing air is supplied at a pressure in the region of 68.95 KN/m$^2$ (10 psi) to an annular chamber 6 by means of a number of channels 5. From this annular chamber 6, lead a number of apertures 8 so disposed that the compressed air may flow radially outwardly into a swirl chamber 7 as can be more clearly seen in FIG. 2. The apertures 8 are angled substantially equally so that the air exiting therethrough assumes a tangential flow within the chamber 7.

The swirl chamber 7 is defined between an outer wall 9 of the oil discharge system and an inner wall 10 of a nozzle cap 11. Walls 9 and 10 converge from the apertures 8 to an air discharge nozzle 12. This air discharge nozzle 12 emits a tube of rapidly swirling air into a zone immediately surrounding the emitted tube of charged oil. Interaction between these tubes causes the oil to be atomized and sprayed into a conic form by virtue of the swirling effect of the air. Because the air flows radially outwardly into the swirl chamber 7 through apertures 8 the inlet diameter of the swirl chamber is only limited by the overall diameter of the nozzle head, and therefore the possible range of ratios between the inlet and outlet diameters of the swirl chamber is maximized, which results in greater versatility in the conic angle of the oil spray The shape of the swirl chamber 7 is such that the air emitted therefrom has a very high angular velocity at nozzle 12 without the air being supplied at a very high pressure. Accordingly, the cone of atomized oil particles formed by the apparatus has a cone angle in the region of 60° to 70°. This enables the apparatus to be placed closer to the containers to be coated and still coat the sides thereof, thereby reducing extraneous deposition of oil. The apparatus may be used in coating baking tins interiorly with release oil composition by passing the tins beneath a pair of such spray heads. For each tin, a spray time of 50 to 300 msecs may be allowed, during which time 0.4 to 1.0 g of oil may be deposited on the interior of the tin. The tins pass beneath the spray heads with a clearance of a distance in the region of 10 to 20 mm and this short distance, combined with the electrostatic charging of the oil particles, ensures that a minimum amount of oil is deposited exteriorly of the tins.

The presence of a tin to be sprayed is determined by a sensor, such as a proximity sensor or trip switch. This actuates a comparatively high pressure (e.g. 80 psi) air source which acts on a piston firstly to allow a flow of atomizing air to channels 5 and then, immediately subsequently, to withdraw the needle from the needle seat 2 to allow the flow of oil from the reservoir 1. In this way, flow rates of over 8000 tins per hour may be achieved.

I claim:

1. An electrostatic spray apparatus comprising a source of liquid, an annular nozzle having a central axis and connected to the source of liquid for discharging a hollow tube of electrostatically charged liquid, a source of atomizing air under pressure, an annular atomizing air discharge nozzle surrounding said liquid discharge nozzle, an annular swirl chamber for said atomizing air, and a plurality of apertures connecting said source of air to said swirl chamber, each of said apertures being oriented at an angle to a radial direction relative to the central axis to initiate a substantially tangential swirling flow of air in the chamber characterised in that said apertures are disposed to allow air to pass radially outwardly into said chamber, said swirl chamber being defined by walls which tend to converge in an axial direction from said plurality of apertures towards said air discharge nozzle, and said source of liquid is electrostatically charged.

2. A spray apparatus according to claim 1, wherein the liquid is oil or an oil containing composition.

3. A spray apparatus according to claim 1 or claim 2, wherein said swirl chamber decreases in median radial diameter from said plurality of apertures towards said air discharge nozzle.

4. A spray apparatus according to claim 1 wherein the source of atomizing air is at a pressure in the region of 68.95 KN/m$^2$ (10 psi).

5. A spray apparatus according to claim 1 wherein the source of liquid is at a pressure in the range of 27.58 KN/m$^2$ to 82.74 KN/m$^2$.

6. A spray apparatus according to claim 1 wherein the source of liquid is electrostatically charged by means of a charge of 50,000 volts.

7. A spray apparatus according to claim 6, wherein the source of liquid is charged at a rate of 100 microamps.

8. A spray apparatus according to claim 1, wherein the liquid is a release oil composition.

* * * * *